July 21, 1970 G. J. CRANK 3,521,012

REPEATER WITH POWER SEPARATION FILTERS

Filed June 10, 1968 2 Sheets-Sheet 1

GEOFFREY J. CRANK
INVENTOR

BY Hall & Houghton
ATTORNEY

July 21, 1970 G. J. CRANK 3,521,012

REPEATER WITH POWER SEPARATION FILTERS

Filed June 10, 1968 2 Sheets-Sheet 2

INVENTOR
GEOFFREY J. CRANK,
BY Hall & Houghton
ATTORNEY

United States Patent Office 3,521,012
Patented July 21, 1970

3,521,012

REPEATER WITH POWER SEPARATION FILTERS

Geoffrey James Crank, New Barnet, England, assignor to Her Majesty's Postmaster General, London, England Filed June 10, 1968, Ser. No. 735,857
Claims priority, application Great Britain, June 12, 1967, 26,989/67
Int. Cl. H04b *3/44*
U.S. Cl. 179—170 9 Claims

ABSTRACT OF THE DISCLOSURE

A repeater is disclosed which comprises a signal-frequency path including the input to output path of an amplifier, a D.C. path in parallel with the signal frequency path and including the D.C. feed paths through the amplifier, a relay winding included in series with the D.C. path, and a break contact of the relay shunting the D.C. feed paths of the amplifier. When D.C. power is supplied to the repeater, the relay is energized to open its contact and thereby remove the shunt from the amplifier D.C. feed paths.

Figure 1:
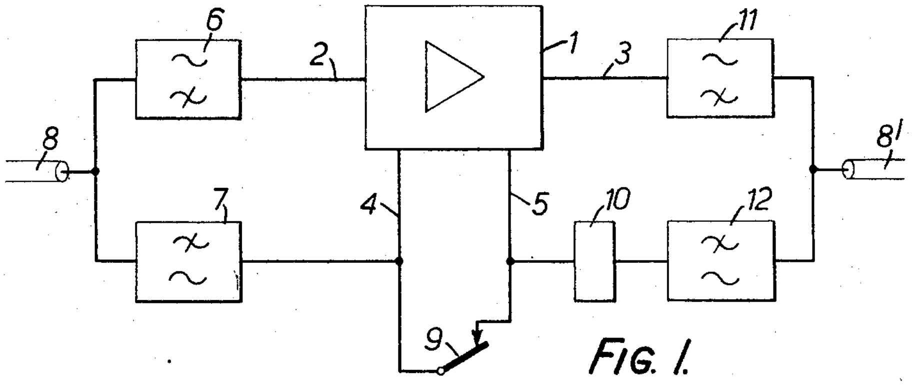

In long distance transmission systems incorporating unattended repeater stations, particularly in submarine cable systems, it is known to feed the D.C. power for the repeaters over the communication path itself. At each repeater, filter arrangements are provided to separate the communication signals from the D.C. feed and to recombine them for onward transmission to the next repeater. In such a system the D.C. feed paths in the several repeaters are all in series. The power supply unit at one end (or one unit at each end) of the cable is so constructed as to deliver a constant current to the cable. A short circuit at some intermediate point in the cable does not therefore result in damage to the repeaters. Although such systems contain supervisory circuits for the location of faults, this does not eliminate the need for other methods of fault location. Faults may occur in the cable and in repeaters and equalizers forming part of the transmission system but, in general, cable faults are the most difficult to locate.

One method of locating faults on such a system involves the application to the cable of a relatively small testing current which may be D.C. or may be A.C. of very low frequency (e.g., 1 c./s.) superimposed on D.C. so that no polarity reversal occurs. During fault location, the repeaters are deenergized and the testing current flows through the D.C. power feed circuits of the repeaters. If the repeaters employ thermionic valves, the heaters of the valves in each repeater are all in series with the cable and the anode-cathode paths are in shunt with the heater chain. Thus a relatively low D.C. resistance of the order of 100 ohms is presented by the heaters of the repeater to the cable. This resistance is current-dependent.

If the repeaters employ transistors then there is nothing corresponding to the relatively low resistance heater chain in shunt with the collector-emitter paths through the transistors. Moreover, at low values of current such as are used in fault location tests transistors present a resistance which is very high relative to that of the cable, and which varies with current, temperature, age of the transistors, etc.

It has hitherto been found necessary, in such systems, to shunt the D.C. path through the amplifier with a relatively low resistance to facilitate the testing procedures, but this necessarily involves an increase in line current under working conditions. Even so, the minimum acceptable value of resistance is too high to permit accurate cable fault location.

It is an object of the present invention to provide a repeater which presents a low resistance to small currents without any increases in the line current under normal working conditions.

According to the invention, a repeater comprises a signal-frequency path including the input to output path of an amplifying device, a D.C. path in parallel with the signal frequency path and including the D.C. feed paths through the amplifying device, a relay winding included in series with the D.C. path, and normally-closed contact of the relay in parallel with the D.C. feed paths of the amplifying device.

By "normally-closed" contact is meant one which is closed when no current flows through the winding of the relay.

The parallel connection of the relay contact with the D.C. feed paths of the amplifying device may include a single-operation device of such form that, on operation, the device open circuits the parallel connection.

The single-operation device may be a fusible cutout with a predetermined time lag.

Alternatively, the single-operation device may be bridged by a D.C. path presenting a high resistance to flow of line current in the normal direction to energise the repeater, and a low resistance to the flow of D.C. in the reverse direction.

The path may include a rectifier poled to offer high resistance to the flow in the normal direction of current along the D.C. path and low resistance to the flow in the opposite direction.

As a safety precaution, it may be desirable to add a further normally-closed contact in series connection with the first-mentioned contact. In the event of one of the contacts remaining closed because of "sticking" the other will open. The chances of both contacts remaining closed is small.

To minimize the shunt impedance of the D.C. path a resistor of low resistance can be shunted across the relay winding.

In a particular embodiment of the invention, the relay winding may be replaced by two separate relay windings each with its own normally-closed contact. The separate relay windings may be series or parallel connected in the D.C. path. If series connection is used each winding may have its own shunt resistor, whereas a single shunt resistor may be employed with the parallel connected windings. The arrangement chosen depends upon the impedance of the D.C. path which is required and the degree of reliability.

By way of example only, embodiments of the invention will now be described in greater detail with reference to the accompanying drawings of which:

FIGS. 1, 2, 3, 4 and 5 show first, second, third, fourth and fifth embodiments respectively in block schematic form only.

Referring to FIG. 1, an amplifier 1 has a signal input lead 2 and a signal output lead 3. Two further leads, 4 and 5, constitute the D.C. feed path to the amplifier. High pass filter 6 and low pass filter 7 serve to separate the signals from the D.C. reaching the repeater over the portion of cable 8. Relay contact 9 bridges the leads 4 and 5 and is controlled by relay winding 10. The output signals from the amplifier are recombined with the D.C. by means of the high pass filter 11 and the low pass filter 12 for onward transmission over the portion of cable $8^1$.

When the magnitude of the direct current passing along the cable is small the contacts 9 in all the repeaters are closed so that each repeater presents only the resistance of its relay winding 10 and its low pass filters 7 and 12. Low current D.C. and low frequency tests can be applied to the communication system of which the repeater forms a part. When the system is to be brought into operation, a direct current, of magnitude appropriate for the amplifiers used, is fed along the cable from a constant current source. In each repeater, this current operates the relay, opening contact 9. The current traverses the D.C. feed path through the amplifier circuits, via leads 4 and 5, so bringing the amplifier into use. Owing to the nature of the current source, there is no change in the magnitude of the current when the contacts 9 in the repeaters open.

The system can be retested when required by disconnecting the constant source, whereupon the contacts 9 close.

Figure 2:
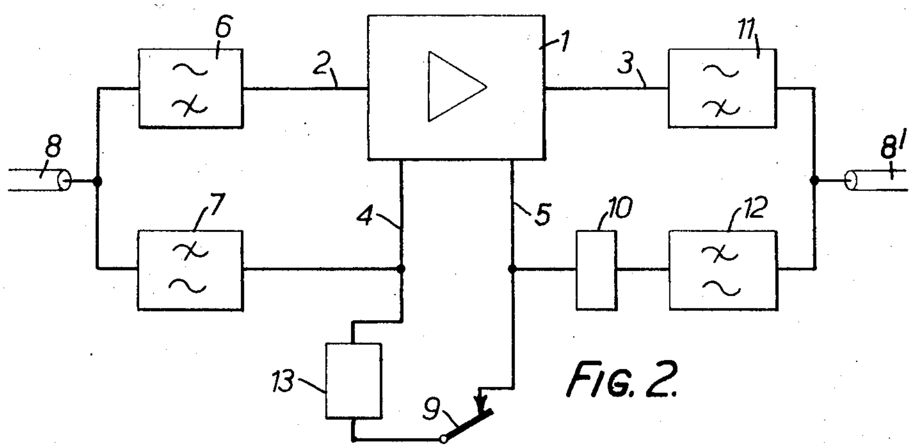

In repeatered submarine cable systems it is usual to apply stringent tests to all the components of a repeater. Nevertheless, it may be desirable to provide an additional safeguard against the possibility that the relay contact might remain closed when the working current is applied to the line. To this end a fusible cut-out device having a suitable time lag may be connected in series with the relay contact. The cut-out may be a heat-coil designed to open the circuit when the working current has flowed through it for (say) one minute. Such an arrangement is indicated in FIG. 2.

If the relay contact remains closed when working current flows, the heat-coil will open the circuit, so allowing the repeater to come into operation. The D.C. path cannot then be reclosed, however, so that this repeater will therefore present a high resistance to testing currents.

It is possible to make allowance for high resistance in one repeater (or in a small number of repeaters) if the condition is known to exist although the accuracy of measurement would be adversely affected because the resistance is very high compared with cable resistance, and is very dependent on current magnitude. It is not to be expected that relay failure will be common among the repeaters in any one cable system. Thus the inclusion of the single-operation device in series with the contact of the relay does not depart from the spirit of the invention.

Figure 3:
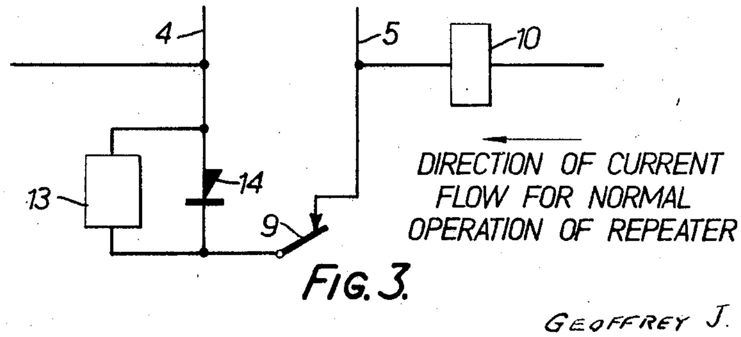

However, by a further modification, illustrated in FIG. 3, the ability to test with a high order of accuracy can be retained. In the figure, a rectifier 14 is connected across the terminals of the heat-coil 13. The rectifier is so connected that it presents a high resistance to the normal working current of the system. Fault location testing can then be carried out using current flowing in the opposite direction, to which the rectifier presents a low resistance.

It will be appreciated that other modifications of the invention are possible. For example, instead of a single contact the relay may be provided with two or more connected in series. Moreover, particularly for transmission systems employing relatively low signal frequencies, so that capacitances associated with the relay and heat-coil may not be significant, the heat-coil and relay contact may be connected directly between the input of filter 7 and the output of filter 12, the relay winding then being connected between the output of filter 12 and the junction of the output of filter 11 with the portion of cable $8^1$.

In the circuit of FIG. 1, the single relay winding 10 shown will, in a typical case, have an approximate resistance and inductance of 1 ohm and 3 mh. respectively. These values seriously curtail the use of all higher frequency fault location methods because of the higher value of inductive reactance possessed by the deenergised repeater at those higher frequencies. For example, at 5 kHz., the inductive reactance of the denergised repeater is about 100 ohms.

The shunt impedance of the D.C. path can be minimised effectively by shunting the relay winding with low value resistor, a typical value being a few ohms, this then being the upper limit of the shunt impedance.

Figure 4:
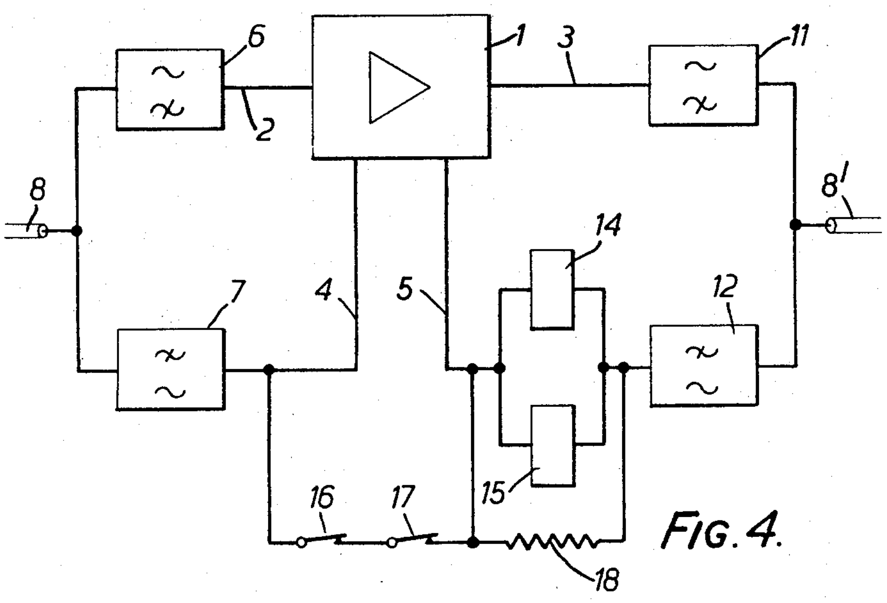

A more efficient method is, however, to employ two parallel connected relay windings 14, 15 as shown in FIG. 4 each with its own normally closed contact 16, 17 respectively. A single resistor 18 is connected in parallel across the windings 14, 15. With the arrangement shown in FIG. 4, a typical value for the shunt resistor 18 is 1 or 2 ohms and this represents the maximum value of the high frequency shunt impedance.

The use of two parallel connected relay windings safeguards against open circuit faults in either winding but a short circuit across one winding prevents operation of both relays.

Figure 5:
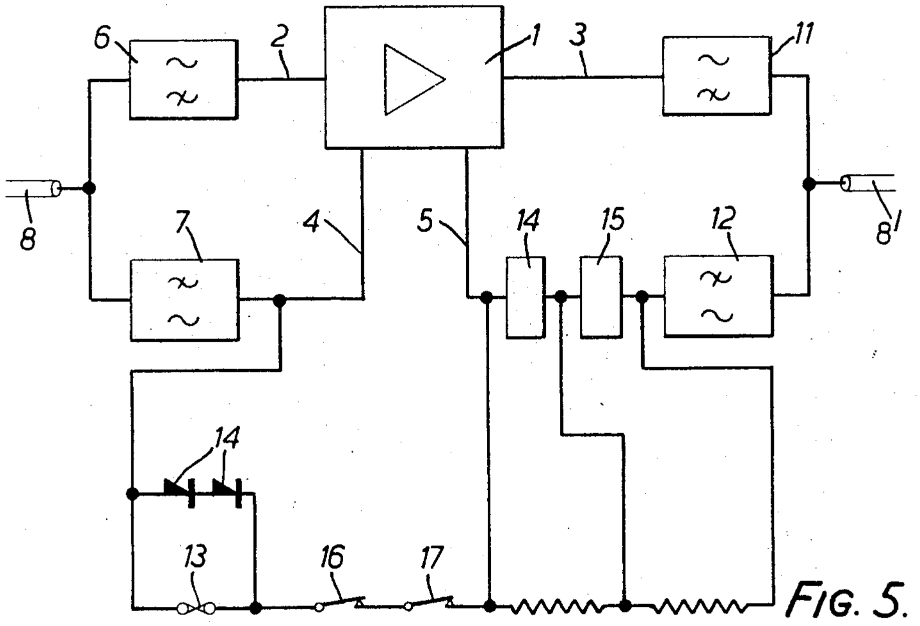

A lower fault liability can be achieved by using separate relay windings in series as shown in FIG. 5. In this case, both open and short circuit conditions in either relay winding are guarded against. However, whilst the high frequency impedance of the circuit of FIG. 5 is low, it is higher than that of FIG. 4. FIG. 5 also shows the use of a fusible cut-out 13 shunted by diodes 14 poled to offer a high resistance to the flow of line current in the normal direction to energise the repeater and a low resistance to the flow of D.C. in the reverse direction.

In general, the use of impedance frequency tests is facilitated if the deenergised repeater matches as closely as possible the adjacent cable sections and this is best achieved by minimising the effective series resistance of the deenergised repeater.

I claim:

1. A repeater comprising a signal-frequency path including the input to output path of an amplifying device in the repeater, a D.C. path in parallel with the signal-frequency path and including the D.C. feed path through the amplifier, a relay winding included in series in the D.C. path, and a normally-closed contact of the relay in parallel connection with the D.C. feed path of the amplifying device.

2. A repeater as claimed in claim 1 and further comprising another relay winding in series connection with the first-mentioned relay winding, the other relay having a normally-closed contact in series connection with the first mentioned normally-closed contact across the D.C. feed path of the amplifying device.

3. A repeater as claimed in claim 1 and further comprising another relay winding in parallel connection with the first mentioned relay winding, the other relay having a normally-closed contact in series connection with the first mentioned normally-closed contact across the D.C. feed path of the amplifying device.

4. A repeater as claimed in claim 1 in which there is a single-operation device in series connection with the first mentioned normally-closed contact across the D.C. feed path of the amplifying device, the single-operation device being of a form such that, on operation, the device open-circuits the parallel connection.

5. A repeater as claimed in claim 4 in which the single-operation device is a fusible cut-out with a predetermined time lag.

6. A repeater as claimed in claim 4 in which there is a D.C. path bridged across the single operation device only, the D.C. path offering high resistance to the flow of line current in the normal direction to energise the repeater when in use, and a low resistance to the flow of D.C. in the reverse direction.

7. A repeater as claimed in claim 6 in which the D.C. path includes at least one rectifying device.

8. A repeater as claimed in any one of the preceding claims in which the relay winding are shunted by a resistor of low resistance.

9. A repeater as claimed in claim 2 in which each relay winding is shunted by a resistor of low resistance, the resistors being series connected across the relay windings and in which there is a D.C. path from the connection between the resistors to that between the relay windings.

References Cited

UNITED STATES PATENTS

| | | | |
|---|---|---|---|
| 2,288,487 | 6/1942 | Rosen. | |
| 3,297,833 | 1/1967 | Hooten | 179—175.31 |

RALPH D. BLAKESLEE, Primary Examiner

W. A. HELVESTINE, Assistant Examiner